Figure 9:
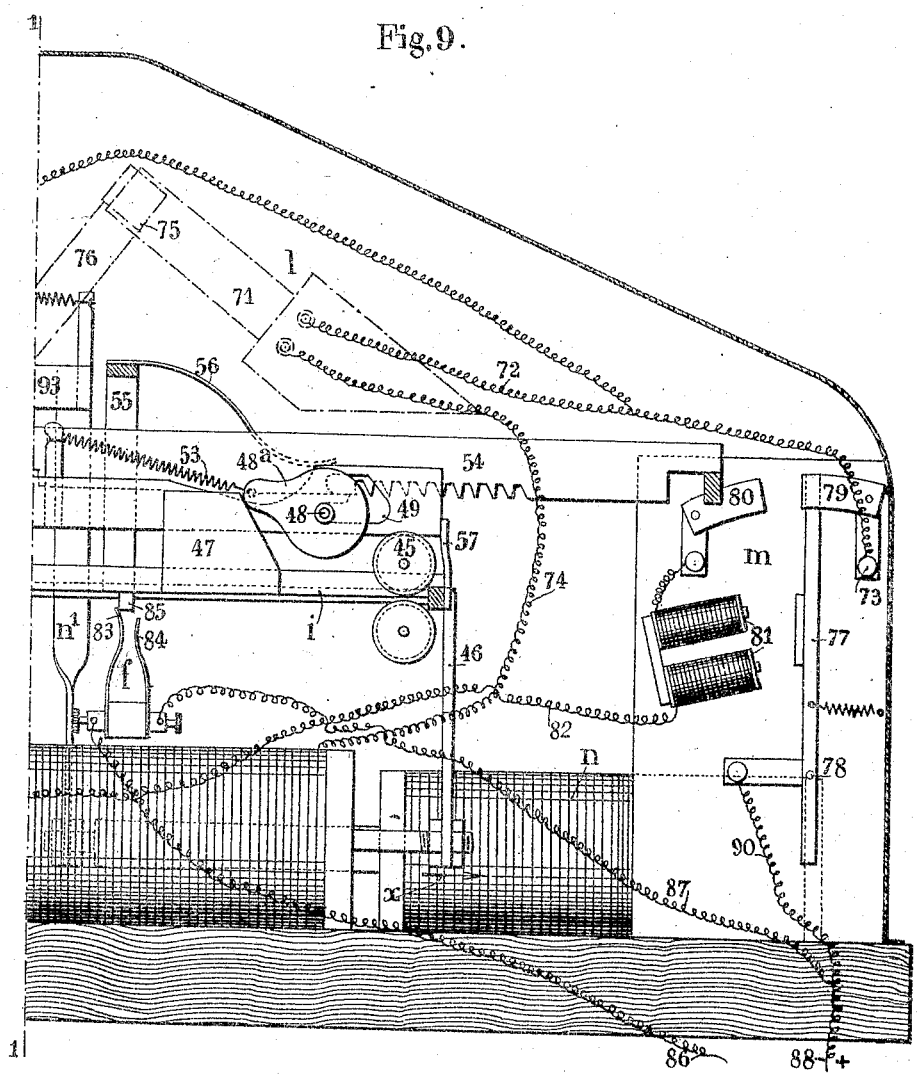

G. I. F. SOULAGE.
APPARATUS FOR ISSUING OR DELIVERING TICKETS AND OTHER ARTICLES.
APPLICATION FILED FEB. 16, 1911.

1,043,639.

Patented Nov. 5, 1912.

6 SHEETS—SHEET 1.

INVENTOR
Georges Isidore Ferdinand Soulage
BY
ATTORNEYS

WITNESSES

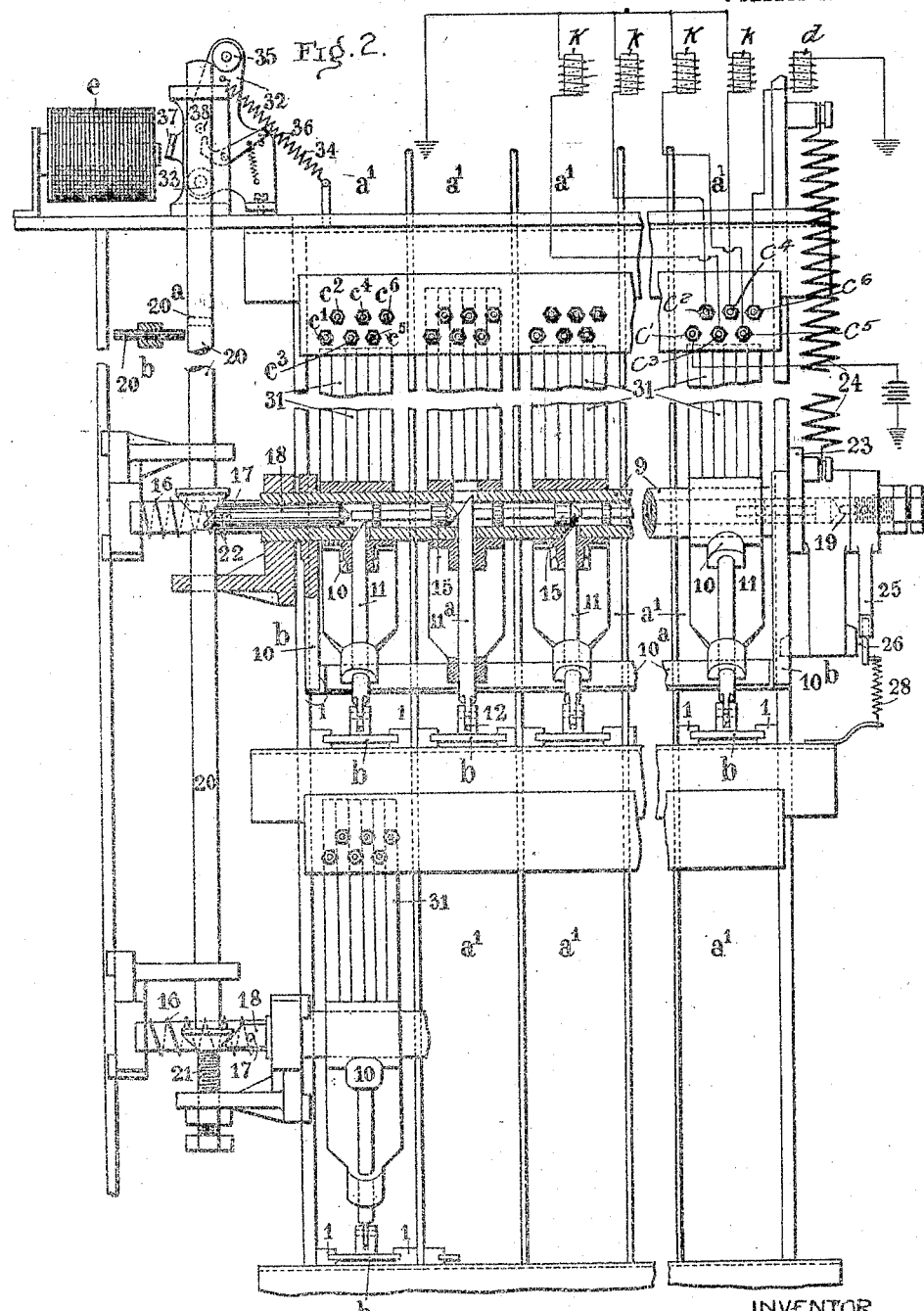

G. I. F. SOULAGE.
APPARATUS FOR ISSUING OR DELIVERING TICKETS AND OTHER ARTICLES.
APPLICATION FILED FEB. 16, 1911.

1,043,639.

Patented Nov. 5, 1912.

6 SHEETS—SHEET 3.

WITNESSES

INVENTOR
Georges Isidore Ferdinand Soulage
BY
ATTORNEYS

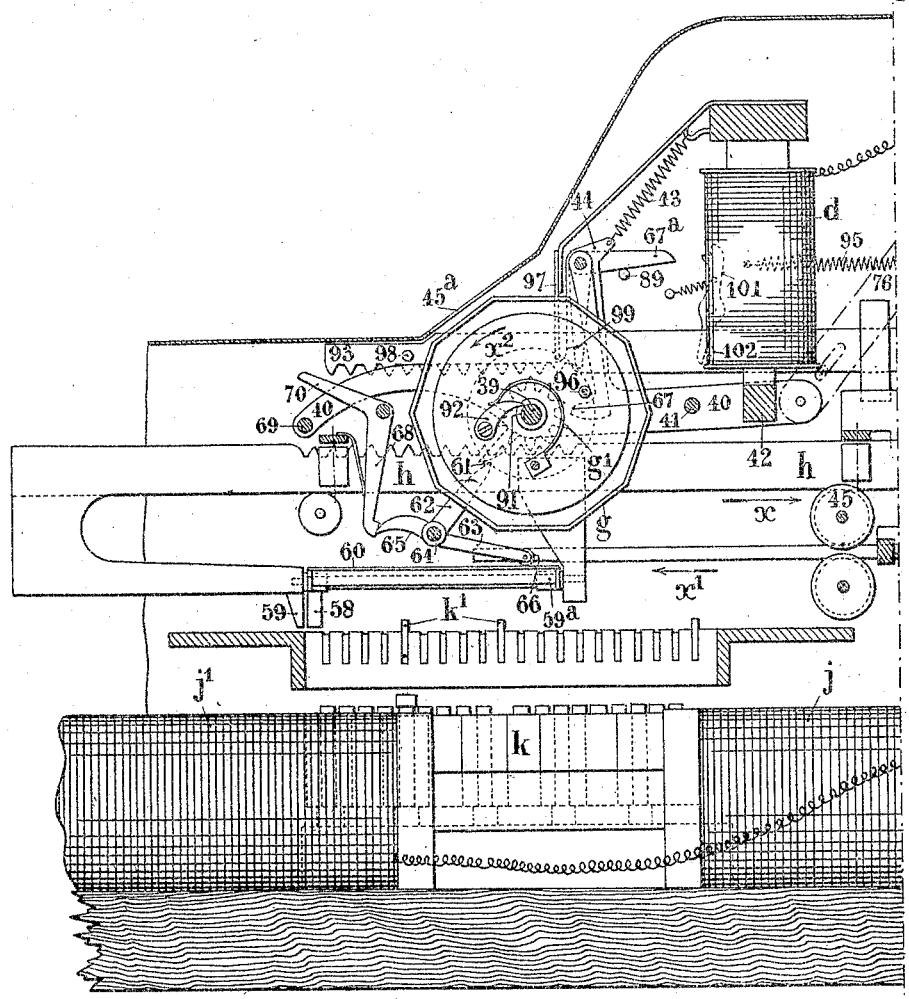

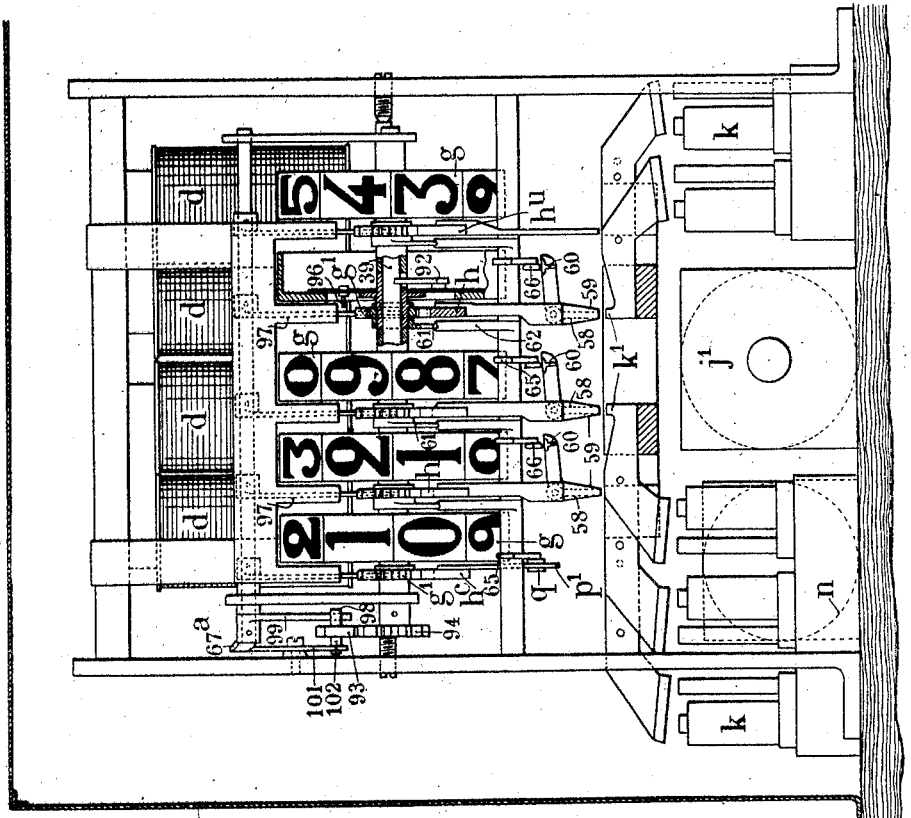
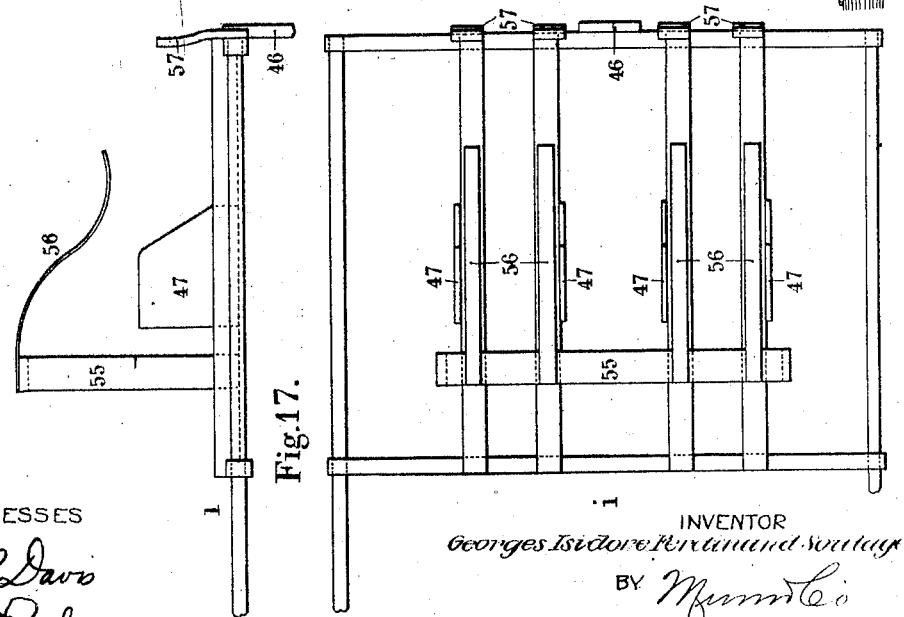

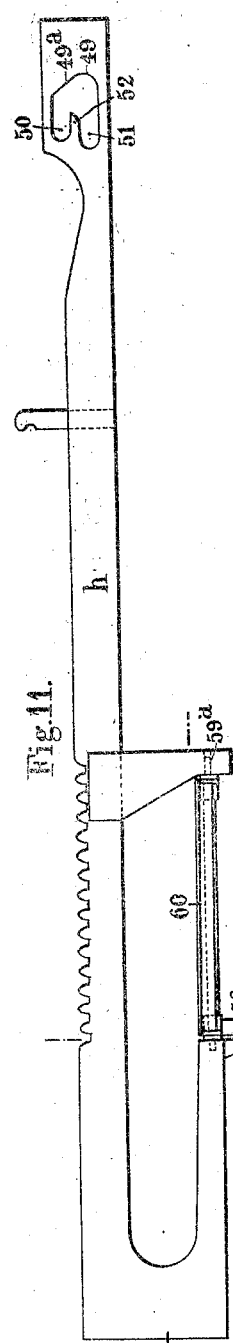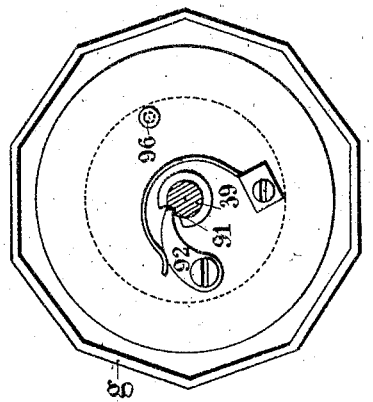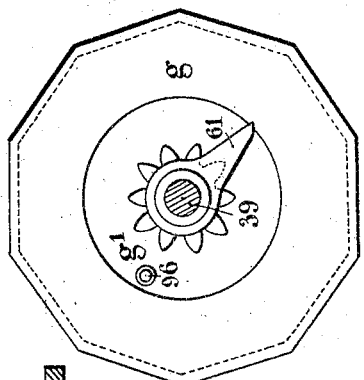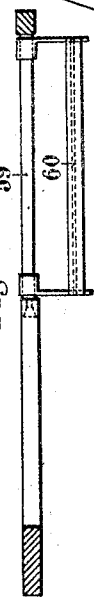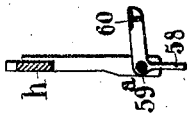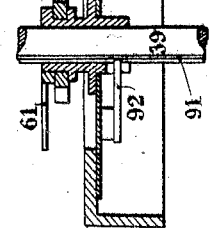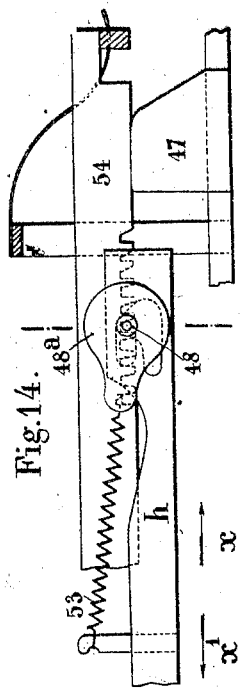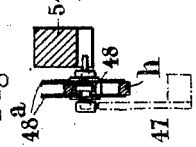

UNITED STATES PATENT OFFICE.

GEORGES ISIDORE FERDINAND SOULAGE, OF PARIS, FRANCE, ASSIGNOR TO SOCIÉTÉ UNIVERSELLE DES APPAREILS CONTROLEURS, OF PARIS, FRANCE.

APPARATUS FOR ISSUING OR DELIVERING TICKETS AND OTHER ARTICLES.

1,043,639. Specification of Letters Patent. Patented Nov. 5, 1912.

Application filed February 16, 1911. Serial No. 609,059.

*To all whom it may concern:*

Be it known that I, GEORGES ISIDORE FERDINAND SOULAGE, of 44 Rue Chanzy, in the city of Paris, Republic of France, engineer, have invented Improvements in and Connected with Apparatus for Issuing or Delivering Tickets and other Articles, of which the following is a full, clear, and exact description.

The object of the present invention is to provide apparatus for issuing or delivering railway and other tickets or other articles wherein the actuation of the devices in withdrawing the ticket or other article at the same time actuates an apparatus which adds the price of the ticket withdrawn to the total value of the tickets previously registered. This apparatus therefore comprises: (a) a delivering apparatus, and (b) adding apparatus for totalizing the value of the tickets issued.

The delivery apparatus is essentially characterized by the following features:

1. Each magazine of the apparatus is provided with a drawer for enabling the tickets to be withdrawn provided with a blade whose front extremity is resilient and whose rear extremity is bent at right angles to the plane of the blade. By this construction the withdrawal of the drawer causes the lowermost ticket to be delivered and at the same time brings the succeeding ticket into the position occupied by the ticket previously issued. The drawer is provided with an aperture adapted to receive a finger integral with a weight which is placed on the pile of tickets in the magazine, the finger penetrating into the hole in the blade when the last ticket has been withdrawn so as to lock the drawer in the closed position.

2. The apparatus is furthermore provided with means which automatically lock all the drawers of the apparatus with the exception of the drawer of the magazine from which the ticket is being withdrawn so as to prevent two or more tickets from being withdrawn simultaneously from two different magazines which would interfere with the working of the adding apparatus. The locking mechanism consists essentially of a number of bolts equal to the number of the magazines disposed in horizontal rows within a hollow spindle and each provided with a conical head in contact with the beveled extremity of a rod which is automatically shifted when the drawer is withdrawn. These horizontal rows of bolts are adapted to be connected with conical heads carried by bolts arranged in vertical rows, said heads coming into contact with the beveled end of the last bolt of each horizontal row. The construction is such that when a drawer is withdrawn its corresponding bolt will be actuated in such a manner that the whole of the other bolts of the other drawers will be locked in order to prevent any of the other drawers being operated.

3. The apparatus is further provided with a device which compels the operator to pull out the drawer to its fullest extent for the purpose of (a) preventing the withdrawal of a ticket whose price would not be registered by the adding apparatus and vice versa; (b) and for bringing the succeeding ticket to the position which the previous ticket occupied just prior to its withdrawal. This device consists of a toothed sector keyed to a hollow spindle in which the horizontal bolts are fitted to slide. This spindle partially rotates when a ticket is extracted from its magazine and the toothed sector is engaged by a pawl which prevents any return motion of the sector until the latter has completed its stroke either in one direction or the other.

4. The issuing or delivering apparatus is also provided with means which prevents the drawer from resuming too rapidly its initial position and interrupting too soon the current necessary to bring about the operation of the adding apparatus comprising an electro magnet whose armature at the required moment locks the column of vertical bolts, thus preventing the return of the drawer to its initial position till after the adding apparatus has effected the adding operation.

The adding apparatus is characterized essentially by the following features.

(1) It comprises racks adapted to engage pinions integral with drums carrying numbers indicating the sum totalized. These pinions and drums are carried by a movable frame electrically actuated in such a manner that the pinions will be automatically brought into contact with the racks during the adding operation.

(2) The racks are moved at each operation and are arrested by stops controlled by electro-magnets which actuate the stops corresponding to the figures of the number to be recorded. These stops project in the path of the racks and so determine the length of the stroke of the racks and according to the length of their stroke, the pinions will remain in engagement with the racks and rotate the drums to an extent corresponding to the figure to be recorded.

(3) The racks are driven by means of an electrically controlled rake and are provided with an automatic device allowing this rake to continue its movement when the rack has been withdrawn. In this manner a return spring with which the rack is provided has always an equal tension, notwithstanding that the length of the stroke of the rack is variable. Furthermore, the rack is always in a position to advance by one tooth if a "carrying-forward" operation has to be made.

(4) Each rack is provided with a fixed and a movable stop adapted to come up against stops limiting their longitudinal movement. The movable stop is adapted to be automatically withdrawn when a "carrying-forward" operation has to be made, thus allowing said rack to advance by one tooth after which the fixed stop comes up against another fixed stop and thus prevents any further movement of the rack.

(5) The adding apparatus is provided with means for returning it to zero, adapted to operate either after a certain number of adding operations or after each adding operation.

The invention is illustrated in the accompanying drawings wherein—

Figure 22:
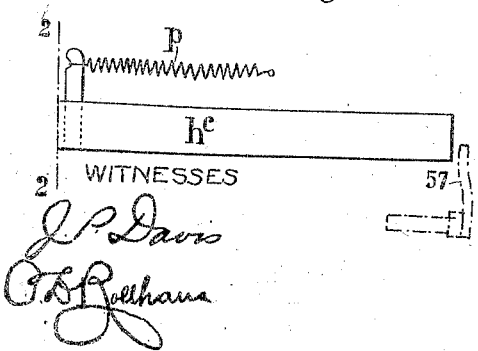

Figure 1 is a vertical section of a portion of the magazine, while Fig. 2 is a corresponding rear elevation partly in section. Figs. 3 and 4 show separately in elevation and plan one of the drawers. Figs. 5, 6 and 7 show details of the apparatus. Fig. 8 is a view of a portion of the apparatus similar to that shown in Fig. 2, illustrating the position which the parts occupy during one phase of the operation. Fig. 9 is a vertical section of the right hand portion of the adding mechanism, Fig. 9$^a$ is a similar view of the left hand portion of said mechanism. Fig. 10 is a corresponding face view. Figs. 11, 12 and 13 show in elevation, plan, and side view respectively, a rack appertaining to the adding mechanism. Figs. 14 and 15 show the arrangement of a rack and roller. Figs. 16 and 17 show in elevation and plan the rake of the adding mechanism. Fig. 18 shows the rack corresponding to one hundred units in the case when the price of any individual article is less than 100 francs. Figs. 19, 20 and 21 are detail views drawn to a larger scale. Fig. 22 is a detail view of one of the racks of the adding mechanism.

As will be seen in the drawings, the tickets or other articles $a$ to be issued are stacked in magazines $a^1$ (Figs. 1 and 2), grouped in vertical and horizontal rows. The lowest ticket in each magazine rests upon a pair of slides 1 (Fig. 2) in which the drawer $b$ is fitted to slide. This drawer is provided with a blade-spring $b^1$ whose rear extremity 2 extends above the upper surface of the slides 1 to an extent a little less than the thickness of the ticket, while the front extremity 3 projects upwardly to the same extent and over the inner ends of the slides to form a nib which is capable of being flattened down by reason of its elasticity. In drawing out the drawer $b$ (arrow 4, Fig. 1,) the nib 3 abuts against the lowermost ticket which occupies the position $a^2$ (in which position the ticket exhibits its number at the glazed opening 5) and pushes it forward to the position $a^3$ as shown in the lower part of Fig. 1, so that it may be grasped. At the end of this movement of the drawer the nib 2 of the spring-blade abuts against the edge of the next ticket which has come into the position $a^2$ and takes the place of the ticket just withdrawn.

6 is a weight resting upon the pile of tickets provided with a finger 7, and 8 is a hole in the drawer. When the magazine is empty the finger 7 is received in the aperture 8 and the drawer is locked. The forward movement of the drawer produces, in addition to the ejection of the ticket and the advance of the succeeding ticket, a double result namely: (1) The locking of all the other drawers. (2) The closing of certain electrical contacts which operate the adding mechanism.

The locking of the whole of the drawers, with the exception of the one which is just actuated takes place directly the latter is moved, in the following manner:—At the rear of each range of magazines there is a hollow horizontal spindle 9 (Figs. 1 and 2). Upon this spindle are mounted pieces 10 which serve as guides for rods 11 pivoted in a bracket 12 carried by the drawers. The upper extremity of each rod 11 is beveled off as will be seen in Fig. 2. The horizontal spindle 9 is provided with a specially shaped aperture for each rod, this aperture comprises a rounded portion 13 (Fig. 5) extended to form a slot 14 of a shape corresponding to that of the bevel on rod 11. This aperture enables the spindle 9 to rotate to a certain angular extent, the rods 11 remaining stationary and their beveled ends coming into engagement with the slotted part 14.

When a drawer is pulled out the corresponding rod 11, together with the member 10 is also actuated, the latter comes up against a cross bar 10$^a$ extending between the ends of arms 10$^b$, the opposite ends of which arms 10$^b$ are keyed on the hollow spindle 9 whereby the spindle 9 rotates to a certain angular extent with said cross-bar, while at the same time the extremity of the rod 11 passes into the spindle. Within the hollow spindle 9 are provided bolts 15 which are placed end to end and adapted to slide longitudinally. These bolts are of a length equal to the inter-axial distance between two rods 11. One of the extremities of the bolts carries a conical head whose slope is the same as that of the bevel on the rods 11. All the bolts are identical except the extreme left hand bolt 18 of each series.

16 is a spring which presses against a pin 17 projecting from the last bolt 18 and tends to constantly push the whole row of bolts toward the right against an adjustable stop 19.

The left-hand extremity of each bolt 18 is beveled off at 22 and this bevel contacts with the conical head of a bolt 20 of a vertical column of bolts which connect all the columns of the horizontal bolts. The length of each bolt 20 is equal to the distance between two adjacent horizontal rows of bolts 15. The position of the lowest bolt 20 is adjusted by means of a screw 21 in such manner as to bring the conical head of this bolt exactly in front of the corresponding horizontal bolt 18.

As will be understood, when a drawer is pulled outward the member 10 and the corresponding spindle 9 are rotated, the rod 11 penetrating at same time into the spindle. During the upward motion of the rod 11, its beveled edge comes into contact with the left-hand bolt and pushes it toward the left; this rod then assumes the position shown at 11$^a$ in Fig. 2. Thus, when the rod 11 corresponding to the drawer withdrawn is raised all the bolts are locked as shown in the drawing. The bolts 15 on the same horizontal row to the right of the bolt which has been pushed by the rod 11$^a$, cannot be moved toward the left as the last bolt abuts against the rod 11$^a$ and consequently none of the drawers corresponding to these bolts can be pulled out. The bolts to the left on the same row having also been displaced their ends lock the upper extremity of the corresponding rods 11. The bolts 20 which are above the horizontal row of bolts 15, which have been displaced as previously described, have been raised by the beveled surface 22 of the bolt 18 which has been displaced. (See Fig. 2.)

All the horizontal rows of bolts 15 above that row which has been displaced are locked by their bolts on the left coming against the bolts 20 which have been raised. The rows of bolts 15 situated below that displaced are also rendered immovable, their bolts on the left not being able to raise the corresponding bolts 20, the highest of which abuts against the beveled edge of the left hand bolt 18 of the row of bolts 15 which has been displaced, as already mentioned. It will at once be seen that when a drawer is pulled out it will be impossible to pull out any of the other drawers. It is to be noted that the bolts come into action instantaneously because as soon as any individual drawer is pulled out the corresponding rod 11 begins to rise and the abutting of the parts which produce the locking of the drawers takes place at once.

The locking of the whole system may be otherwise effected, for instance, by introducing a pin 20$^b$ within a hole 20$^a$ provided in the uppermost vertical bolt 20; this pin 20$^b$ is capable of being withdrawn only by means of a master key provided for the purpose. While the drawer is passing from its normal position to its forward position (Fig. 1), the rod 11 first assumes an upright position and is then inclined in the opposite direction, but as during the latter movement it does not become disengaged from the hollow spindle the locking of the other drawers remains effective throughout the whole of the movement of the drawer. When the drawer has been pulled entirely out (Fig. 2) as soon as it is released, it is returned automatically to its original position by a return spring 24; this spring is secured on the one hand to a fixed part and on the other hand to a lever 23 keyed on the spindle 9, the bar 10$^a$ pressing against the member 10 brings back the drawer to its position of rest.

It is necessary that the operator should pull out the drawer to its fullest extent in order that the following ticket may be brought to the position it should occupy before being delivered as should this not take place the extremity 3 of the blade $b^1$ would not have been brought to a position to engage the succeeding ticket and the adding apparatus would record the delivery of a ticket which had not been issued. To prevent this the spindle 9 is provided with a toothed sector 25 against which a pawl 26 engages (Figs. 6 and 7), said pawl being pivotally mounted at 27 and provided with a spring 28 which maintains it in an upright position.

It will be understood that when the spindle 9 rotates in the direction of the arrow 29 (Fig. 6) the pawl will assume the position shown in the drawing. Further rotation of the spindle in the same direction may take place but all movement in the reverse direction is prevented so long as the pawl has not reached the end of the sector, that is to say so long as the spindle 9 has not rotated to an extent corresponding to the total movement of the drawer. When such movement has taken place the pawl, which will have reached the end of the sector, will assume the position shown in Fig. 7, and allow the rotation of the spindle in the reverse direction. Hence any movement which has been started either in one direction or the other must thus be completed. It should be noted that, the spindle 9 may be rotated independently of the rods 11 when the latter are in a position of rest (the beveled edge of the rods moving then in its corresponding aperture), but when the drawer is actuated, the rod 11 enters into the cylindrical portion 13, with the result that the rod and the spindle will not be able to rotate independently of one another. By these means the safety sector 25 is connected to the drawer.

The price of the ticket when withdrawn is added to that already registered by the adding apparatus. This adding apparatus is electrically actuated and for this purpose the movement of the drawer closes a certain number of electrical circuits. On each member 10 is secured an insulating base 30 carrying a spring 31 provided with six fingers which, when the member 10 rotates in the direction of the arrow 4ª, will come into contact with six studs $c^1$, $c^2$, $c^3$, $c^4$, $c^5$, $c^6$. These six studs are normally insulated one from the other and are respectively connected up as follows.

$c^1$ is the stud to which the wire leading current into the apparatus is connected; studs $c^2$, $c^3$, $c^4$, $c^5$ connect with electro-magnets $h$ of the adding apparatus, and stud $c^6$ is a stud to which the wire leading to an electro-magnet $d$ of the adding apparatus is connected. When the drawer is pulled out the six-fingered spring connects these studs together. The source of current is thus connected to the studs $c^2$ which controls the electro-magnet of the tens; $c^3$ of the units; $c^4$ of the tenths and $c^5$ of the hundredths. These electro-magnets can then be energized and attract their armatures as will be hereinafter described. Current is also sent through the electro-magnet $d$ of the adding apparatus as will be described later on.

A certain lapse of time is necessary to allow the adding apparatus to carry out the required operations. If the operator pulls the drawer out very quickly the adding apparatus would not receive current for a sufficient length of time. In order to obviate this the drawer is automatically prevented from returning to its initial position until the operation of the adding apparatus has been completed. To this end I provide an electrically actuated locking device arranged above the last vertical bolt and consisting of a lever 32 actuated by an electro-magnet $e$. This lever is pivotally mounted at 33 and is provided with a return spring 34. It carries a roller 35 and a spring pawl 36; the lever is also provided with an armature 37. The uppermost vertical bolt is provided with a stop 38. As soon as current is transmitted to the adding apparatus by the studs $c^1$ to $c^6$, a switch $f$ of the adding apparatus is closed as will be hereinafter described, and a current passes through the electro-magnet $e$.

The latter attracts the armature 37 but the lever 32 is arrested by the extremity of its pawl which comes against the stop 38.

When the bolt 20 reaches its highest position, which takes place when the rod 11 assumes a vertical position, the pawl 36 passes under the stop and the lever 32 will then rotate and the roller 35 come hard up against the head of the bolt, as shown in Fig. 2. When the rod 11 inclines from the vertical position the bolt 20 will descend a little and the roller 35 will then come up against the head of the bolt, as shown in Fig. 8. The bolt will then no longer be able to rise and consequently the drawer cannot return to its initial position. Thus the drawer is locked and remains so until the operation of the adding apparatus has been completed. When this has been done the switch $f$ will open; the electro-magnet $e$ will then receive no more current and will release the armature 37. The lever 32 will then disengage the bolt and the drawer will be able to return to its initial position.

I will now explain the arrangement and the operation of the adding apparatus. This apparatus consists of a number of drums $g$ (usually five) provided on their peripheries with the figures 0 to 9 (Fig. 10) which are read through a sight hole 45ª in the casing of the apparatus. These drums, which are integral with ten toothed pinions $g^1$ (Figs. 9 and 19), are mounted friction-tight on a spindle 39 carried by a lever 40 rotatably mounted as at 41. This lever is provided with an armature 42 attracted by means of the electro-magnet $d$ previously mentioned. When this electro-magnet is energized it brings about the rotation of the lever 40 and thus lowers the spindle 39. The pinions $g'$ then come into contact with racks $h$. When the electro-magnet is not energized a return spring 43 secured to an arm 44 carried by lever 40 raises this lever and the whole of the drums $g$ and pinions $g^1$, thus separating them from the racks. The racks $h$ are intended to cause the rotation of the pinions $g^1$ and of the drums $g$. At each operation of the adding apparatus the racks make a stroke whose length depends upon the figures to be registered by the adding apparatus. If one of the drums is to rotate to the extent of six units, the stroke of its rack will correspond thereto and coming into contact with the pinion $g^1$, it will cause the pinion to rotate to an extent corresponding to six teeth, while any of the drums which are not to be rotated will have the strokes of their racks stopped before the drums are moved to an extent necessary for a change of numbers at the sight opening. The length of the stroke of the racks is determined by stops $k^1$ carried by levers forming the armature of small electro-magnets $k$ (Figs. 9 and 10). The stops $k^1$ are arranged in rows under the racks. When a ticket is withdrawn having a value of 12 francs 45, for instance, the spring 31 will come into contact with the studs $c^2, c^3, c^4, c^5$, transmit a current through the four electro-magnets $k$, the magnet of which corresponding to hundredths, raises the stop corresponding to the figure 5, while the magnet corresponding to the tenths raises the stop corresponding to the figure 4, etc. The motion of the racks corresponding to the hundredths, tenths, etc., is limited by stops raised in the manner described, and the other racks are limited by the first or zero stops. In the case where the figure of the tenths, units or tens is a 9, the rack travels to the very end and is then arrested by means of a fixed stop. In the case where a figure of the hundredths, tenths, units or tens is a zero, an electro-magnet corresponding thereto prevents any motion of the rack. The racks are actuated by means of a rake $i$ (Figs. 9, 16 and 17) movable horizontally between rollers 45. This rake is electrically actuated by coils $j$ $j^1$ within each of which is disposed a core or plunger under whose right hand extremity (Fig. 9) is mounted an arm 46 connected to the rake. This rake carries stops 47 which act on the rollers 48 (Fig. 15) which actuate the racks.

As will have been understood from the foregoing, each rack advances to a different extent at each operation. On the other hand however, the stroke of the rake $i$ is always the same as that of the cores of the coils $j$ $j^1$. It is therefore necessary that at a suitable position of its stroke the rake should release the rack and continue its stroke independently. It is also necessary that the rack should always have a tendency to continue its stroke in a forward direction when the drum of the adjacent rack (corresponding to units of an immediately lower order) passes from 9 to 0 and renders necessary the advance by one tooth of the adjacent rack, and of its drum in order to register the carry-forward. This is effected in the following manner.

Each roller 48 engages in an aperture 49 of special shape provided in the rack. This aperture is provided with two slots 50 and 51 (Fig. 11) separated by a tongue 52. The roller is integral with the two cheeks 48$^a$ which maintain it laterally and prevent it from coming out of the aperture 49. One end of a spring 53 is attached to the cheek 48$^e$ and the other end to the rack. By the side of each rack $h$ is disposed a fixed rack 54 (Fig. 9), provided with teeth of special shape whose spacing is the same as that of the teeth of the movable rack and whose lower edge is at the same level as the lower edge of the slot 50 of the aperture. When a movable rack $h$ moving in the direction $x$ is arrested by the stop $k^1$ of its row which has been previously raised, the rake $i$ will continue its course and the roller 48 will be pushed by the member 47 acting on a small extension of the axis of the roller, and the spring 53 put under tension while roller 48 moves in aperture 49. The roller is displaced within the slot 51 till it escapes the finger 52. At this moment, owing to the double action of the spring and of the member, it jumps within the slot of the rack 54 below which it is at that moment. The roller being thus withdrawn leaves a free passage for the member 47 whose upper edge maintains the roller within the slot of the rack 54. The spring 53 being then in tension the rack $h$ will be capable of advancing if a "carry-forward" operation has to be made. If this advance of the rack takes place the roller will place itself within the slot 50.

When the registering operation has been effected it is necessary that the racks should be returned to their initial position. To this end the rake $i$ carries a member 55 on which are fixed blade-springs 56 which press against the cheeks 48$^a$ when they are above the latter. The rake $i$ carries also members 57 which come up against the racks when the rake returns in the direction $x^1$ on its return stroke after member 47 has passed beneath roller 48 as will be seen by comparison of Figs. 9, 14 and 15. The rake then drives the racks with it. Each spring 53 is then under tension as before stated and the roller 48, pushed downwardly by the spring 56 and aided by the cam surface 49$^a$, escapes from the finger 52 as soon as the rack has advanced sufficiently and is drawn in the slot 51 by said spring 53 where it resumes its initial position. The rake will then return the rack to its initial position.

The limitation of the stroke of a rack $h$ by means of stops $k^1$ is effected by means of a movable stop 58 behind which is disposed a fixed stop 59 (Figs. 11, 12 and 13). The movable stop 58 is integral with a socket rotating upon an axis 59$^a$ (Fig. 13) disposed in the longitudinal plane of the rack and provided with a side piece 60 placed at right angles relatively to the stop 58. When the stop 58 comes up against the stop $k^1$ which has been raised, the rack is arrested in the manner previously described.

When a "carrying forward" operation has to be made it is necessary to withdraw the stop 58. The rack $h$ will then advance under the action of the spring till the fixed stop 59 comes up against the stop $k^1$, this corresponding to the advance of one tooth. The removal of the stop 58 is obtained as follows. Each pinion $g^1$ carries a finger 61 (Figs. 9 and 19) secured in such a manner as to come up against the arm 62 of a lever 63 pivotally mounted at 64 when the drum passes from the 9 to the 0. The lever 63 carries a roller 66 which presses up against the the side piece 60 of the adjacent rack of the order of units immediately higher to it. When the drum passes from 9 to 0 the finger 61 causes the lever 63 to rotate; the roller 66 then presses on the side piece 60 of the rack of the order immediately higher to it and causes the stop 58 of this rack to rotate. Stop 58 will thus be removed from the path of the traveling member. The rack being drawn by means of the spring 53 will advance till its fixed stop 59 comes up against the stop $h^1$. During this motion it causes its drum to advance by one unit, thus effecting the "carrying-forward" operation.

It is necessary that the movable stop 58 should remain withdrawn until the total adding operation has been carried out because the rack which has just effected a "carrying-forward" operation may still be moving and should occupy a new position, such position depending upon the value of the "carry-forward." To this end the lever 63 carries another arm 65 with which a pawl 68 engages. The lever 63 thus remains in the position where it presses upon the side piece 60 and holds the stop 58 withdrawn so long as a stop 69, secured to the frame 40 carrying the indicating rollers, does not come into contact with the arm 70 of the pawl 68, this only taking place when the armature 42 is lowered and the pinions $g^1$ withdrawn upon the completion of the adding operation.

Referring now to Fig. 10, it will be noticed that the three central racks $h$ are identical and are provided with movable stops 58. The right-hand rack $h^u$ which corresponds to the hundredths, need not however be provided with this movable stop as it has not to effect any "carrying-forward" operation. The rack $h^c$ corresponding to the hundreds is however, of special shape.

In the apparatus shown in the drawings it has been assumed that the delivery apparatus did not contain tickets of a higher value that 100 francs; therefore the rack appertaining to the hundreds is not actuated by the operation which records the individual price of the ticket, but only comes into action when the wheel corresponding to the tens has effected one complete rotation, at which time the wheel corresponding to the hundreds must advance by one unit. The rack $h^c$ (Fig. 18) is constantly drawn in the direction $x$ by means of a spring $p$ but it is arrested by means of a stop $p^1$ which comes up against a roller $g$ secured to the extremity of a lever 63 identical to the levers provided on the other racks. A spring $g^1$ tends to maintain the arms 65 of this lever against a stop $g^2$ mounted upon one side of the apparatus. The stop $p^1$ is provided with two faces $r$ $r^1$ placed at a distance apart equal to the teeth of the rack. When the wheel of the tens passes from 9 to 0 its finger 61 pushes the arm 62 of the lever along and causes it to lower the roller $g$. The latter no longer holds the rack which then advances under the action of its spring $p$ and then stops when the face $r^1$ comes up against the roller $g$. The pinion corresponding to the hundreds is thus advanced by one unit and the "carrying-forward" operation is effected.

When the adding operation has been effected and the pinions are withdrawn from engagement with the racks the rake $i$ returns in the direction $x^1$. One of its extensions 57 comes up against the rack $h^c$ and returns it to its original position and also imparts tension to the spring $p$. The roller $g$ will then resume its original position on the face $r$ of the rack and the rack is then ready for effecting a new "carrying-forward" operation. This construction of the rack for the hundreds is also applied to the rack for the thousands, ten-thousands, etc., on the apparatus which are provided with totalizing drums.

In order to prevent the drums from rotating by themselves during the motion of the frame 40 necessary to bring the pinions $g^1$ into and out of engagement with the racks, a comb 67 is pressed by a spring into the teeth of the pinions when the latter are not in engagement with the racks. When the pinions come near to the racks a lever $67^a$ integral with the comb, comes up against a fixed stop 89 and withdraws the comb from the pinions, leaving the latter free to rotate under the action of the racks. The adding apparatus is furthermore provided with a switch $l$ constituted by two blades 71 connected the one by a wire 72 with a stud 73, the other by a wire 74 to the entering wire of the coil $j$. Between the blades 71 may be inserted a contact 75 carried by a member 76 pivotally mounted with the drum-carrying frame 40.

An automatic switch $m$ intended to reverse the motion of the rake consists of a lever 77 pivotally mounted at 78 which is able to come into contact with a contact-piece 79 or a contact 80. The contact 79 is connected to a stud 73 while the contact 80 is connected through a coil 81 and wire 82 to the coil $j^1$. Finally, the switch $f$ which has been previously described is adapted to be actuated by the rake $i$ and consists of two blades 83, 84 which are normally in contact but which are separated when a heel-piece 85 on the rake comes up against the blade 83. A wire 86 connects the blade 83 to the electro-magnet $e$ and another wire 87 connects the blade 84 to the wire 88 leading in the current which is connected with the stud $c^1$.

The entire operation of the adding mechanism is as follows: When a ticket is withdrawn the spring 31 comes up against the studs $c^1$, $c^2$, $c^3$, $c^4$, $c^5$, $c^6$. As has been described (see Figs. 1 and 2) the current coming in at the stud $c^1$ passes through the studs $c^2$, $c^3$, $c^4$, $c^5$ to the magnets $k$ corresponding to the figures of the price of the ticket. The latter attract their armatures and cause the stops $k^1$ to project. Current from $c^1$ also passes to the studs $c^6$ and thence to the electro-magnet $d$. The latter attracts the frame 40 and lowers the pinions $g^1$, thus bringing the pinions into engagement with the racks $h$. During this movement the lever 40 carries with it the lever 76 which inserts its contact 75 between the blades 71 (see Fig. 9). The current is led to the coil $j$, through wire 88, wire 90, lever 77, wire 72, contact 75, blade 71, and wire 74. The coil $j$ being then energized, shifts the plunger common to the coils $j$ $j^1$ in the direction $x$, the plunger drawing with it the rake $i$ in the same direction. The rake itself then drives the racks $h$ by means of the stops 47 and the rollers 48, but releases them when the movable stops 58 or the fixed stops 59 come up against the stops $k^1$ which have been raised. The motion of the racks thus causes the pinions $g^1$ and the drums $g$ to rotate. When the rake has thus abandoned all the racks the adding operation is complete. The return of all the members to their initial position then takes place as follows. The soft iron core of the coils $j$ $j^1$ arriving at the end of its stroke in the direction $x$, comes up against the foot of the lever 77 and causes it to rotate. The lever 77 abandons the contact 79 and engages with the contact 80. It is maintained in this new position by the coil 81, the current being immediately interrupted in the coil $d$ and the coil $j$. The current then passes to the coil $j^1$ through 81 and 82. As the electro-magnet $d$ is no longer energized the frame 40 will rise, the pinions leave the racks, the member 69 disengaging 65 from 68, the comb 67 then engaging the pinions; concurrently therewith, under the action of the coil $j^1$, the rake $i$ will move in the direction $x^1$ driving with it all the racks by means of the extensions 57; the rollers 48 will then be disengaged from the fixed racks as has been previously described and resume their position within the movable racks. When the rake $i$ reaches the end of its stroke $x^1$, the heel 85 will open the switch $f$ which controls the electro-magnet $e$ as has been previously described when describing the locking mechanism. The opening of this switch $f$ allows the ticket withdrawing apparatus to return to its initial position and as a result the current passing to the electro-magnets $k$ and to the coil $j^1$ is interrupted. The adding mechanism is then ready to carry out a new operation.

The adding mechanism may be provided with an arrangement for returning the graduated drums to zero enabling these drums to be brought in front of the sight-hole after one or more adding operations. The return to zero after each operation is necessary when the adding mechanism is employed for the sole purpose of indicating the individual price and of causing the price of each ticket withdrawn to appear. The spindle 39 carries a longitudinal groove 91 (Fig. 20) whereas the drums $g$ carry spring-pressed pawls 92. The shape of the slot 91 is such that when the drums rotate in the direction in which they rotate during the adding operation the spindle 39 remains stationary, the pawls revolving freely around the spindle without coming into engagement with it. But if the drums remain stationary and the spindle 39 is caused to rotate in the direction $x^2$ (Fig. 9) they will then engage in the slot and cause the drums to rotate. It is only necessary to cause the spindle 39 to rotate to the extent of one revolution for it to come up against all the pawls and to bring the whole of them into line; by arresting the slot in a suitable position all the zeros will be in front of the sight-hole. The rotation of the spindle 39 is effected by means of a rack 93 which engages a pinion 94 secured to the spindle 39 when the frame 40 is in its raised position. By means of an electrical connection which may be established in any suitable manner (for example, by putting the dating stamp on the ticket in the case where it is desired to return the apparatus to zero after each adding operation) a current is transmitted through a coil $n$ whose plunger, provided with an extension $n^1$, drives the rack 93. The rack 93 is then moved in the direction $x$, this having no effect as the spindle 39 does not then engage with the pawls. During this movement the spring 95 of the rack is placed under tension. When the current passing through the coil $n$ is interrupted, the rack is withdrawn under the action of the spring in the direction $x^1$, causing the spindle 39 to rotate in the direction $x^2$, thus returning the drums to zero. In order to prevent the momentum of the drums from carrying them beyond the required position, a stop 96 is fixed upon each drum (Figs. 19, 20 and 21), such stop being capable of passing in front of a fixed stop 97 when the frame is lowered in its adding position, said stop 96 coming against the stop 97 when the frame is raised, this taking place when it is desired to return the apparatus to zero. During the movement of the rack 93 in the direction $x$ it is necessary that the drum should remain stationary, the comb 67 then remaining in position. But at the end of the stroke a stop 98 secured to the rack 93 comes up against the finger 99 which is integral with the comb and withdraws it from the teeth. The arm $67^a$ of the comb then engages the nib of a pawl 101; the comb is then withdrawn from the pinions $g^1$ during the return motion of the rack and as long as the apparatus is being returned to zero. At the end of this return stroke the stop 102 secured to the rack unlocks the pawl 101 which then disengages the comb.

Claims:

1. In an apparatus for delivering tickets and other articles, magazines containing the tickets, drawers for withdrawing the tickets, an electric device for adding the price of each ticket actuated by the drawers, a spring blade on each drawer, whose front end is resilient and whose rear end is bent upwardly at right angles to the plane of the blade.

2. In an apparatus for delivering tickets and other articles, magazines containing the tickets, drawers for withdrawing the tickets, an electric device for adding the price of each ticket actuated by the drawers, horizontal and vertical drawer locking bolts, and means for actuating the said bolts through the medium of the drawers.

3. In an apparatus for delivering tickets and other articles, magazines containing the tickets, drawers for withdrawing the tickets, an electric device for adding the price of each ticket actuated by the drawers, horizontal bolts with conical heads, rods with beveled heads having connection with said bolts, hollow spindles containing the bolts, and provided with notches, members hinged with the drawers and actuating the hollow spindles and bolts in their movement.

4. In an apparatus for delivering tickets and other articles, magazines containing the tickets, drawers for withdrawing the tickets, an electric device for adding the price of each ticket actuated by the drawers, horizontal bolts with conical heads, rods with beveled heads having connection with the bolts and actuated by the drawers and vertical bolts with conical heads having connection with the horizontal bolts.

5. In an apparatus for delivering tickets and other articles, magazines containing the tickets, drawers for withdrawing the tickets, an electric device for adding the prices of the tickets actuated by the drawers, members hinged with the drawers, hollow spindles on which are mounted said members, toothed sectors carried by the hollow spindles and pawls in engagement with said toothed sectors.

6. In an apparatus for delivering tickets and other articles, magazines containing the tickets, drawers for withdrawing said tickets, a locking mechanism for said drawers, an electric device for adding the prices of the tickets, having figuring electro-magnets and actuated by the drawers, and contact studs and connections leading to the figuring electro-magnets of the adding device.

In an apparatus for delivering tickets and other articles, magazines containing the tickets, drawers for withdrawing said tickets, a locking mechanism for said drawers, an electric device for adding the prices of the tickets having a controlling electro-magnet and figuring electro-magnets and actuated by the drawers, contact studs, connections leading to the figuring electro-magnets from said studs, and connections leading also from the studs to the electro-magnet controlling the adding device.

8. In an apparatus for delivering tickets and other articles, magazines containing the tickets, drawers for withdrawing said tickets, a locking mechanism for said drawers, an electric device for adding the prices of the tickets, actuated by the drawers and embodying contact studs, connections leading from said studs to an electro-magnet, an armature, and a frame carrying indicating drums and their toothed pinions and with which the armature is integral.

9. In an apparatus for delivering tickets and other articles, magazines containing the tickets, drawers for withdrawing said tickets, a locking mechanism for said drawers, an electric device for adding the prices of the tickets, actuated by the drawers and embodying contact studs, connections leading from said studs to an electro-magnet, an armature, a frame carrying indicating drums and their toothed pinions and with which the armature is integral and racks gearing with the pinions.

10. In an apparatus for delivering tickets and other articles, magazines containing the tickets, drawers for withdrawing the tickets, and an electric device for adding the prices of the tickets, actuated by the drawers and the embodying figuring electro-magnets, registering racks, contact studs, electric connections between said contact studs and the figuring electro-magnets, and armatures of these electro-magnets constituting stops for the registering racks.

11. In an apparatus for delivering tickets and other articles, magazines containing the tickets, drawers for withdrawing the tickets, and an electric device for adding the prices of the tickets, actuated by the drawers, and embodying a main electro-magnet and figuring electro-magnets, contact studs, connections with the electro-magnets and the main electro-magnet of the adding device from said studs, racks, and a rake actuated by an electro-magnet for operating said racks.

12. In an apparatus for delivering tickets and other articles, magazines containing the tickets, drawers for withdrawing the tickets, an electric device for adding the prices of the tickets actuated by said drawers, and embodying a main electro-magnet and figuring electro-magnets, contact studs, connections with the electro-magnets and the main electro-magnet of the adding device from said studs, racks, a rake for actuating said racks, stops carried by the rake, rollers carried by the racks, engaged in apertures of the racks and subjected to the action of a spring secured on the racks.

13. In an apparatus for delivering tickets and other articles, magazines containing the tickets, drawers for withdrawing the tickets, an electric device for adding the prices of the tickets, embodying a main electro-magnet and figuring electro-magnets, contact studs, connections with the electro-magnets and the main electro-magnet of the adding device from said studs, racks, a rake driving along the racks, and a fixed stop and a movable stop on each rack.

14. In an apparatus for delivering tickets and other articles, magazines containing the tickets, drawers for withdrawing the tickets, an electric device for adding the prices of the tickets, embodying a main electro-magnet and figuring electro-magnets, contact studs, connections with the electro-magnets and the main electro-magnet of the adding device from said studs, racks, a rake driving along the racks, and a fixed stop and a movable stop on each rack, means for withdrawing the movable stop of a rack when a "carrying-forward" operation of one unit is to be made on this rack.

15. In an apparatus for delivering tickets and other articles, magazines containing the tickets, drawers for withdrawing the tickets, an electric device for adding the prices of the tickets, comprising a main electro-magnet, figuring electro-magnets, drums carrying toothed pinions, contact studs, connections with the electro-magnets and the main electro-magnet of the adding device from said studs, racks, a rake driving along the racks, and a fixed stop and a movable stop on each rack, a finger secured on each toothed pinion, a rocking lever carrying a roller in contact with a portion of the movable stop of the adjacent rack.

16. In an apparatus for delivering tickets, magazines containing the tickets, drawers for withdrawing the tickets, an electric device for adding the prices of the tickets, actuated by said drawers, and embodying a main electro-magnet, figuring electro-magnets, drums carrying pinions, contact studs, connections between said studs and the main and figuring electro-magnets, racks for actuating the drums, one of which racks has a stop provided with two notches, a rake for actuating the racks, a roller engaging the said stop, a lever carrying said roller, and a finger carried by the pinion of the drum of the adjacent rack, for actuating said lever.

17. In an apparatus for delivering tickets, magazines containing the tickets, drawers for withdrawing the tickets, an electric device for adding the prices of the tickets, actuated by said drawers, and comprising drums carrying pinions, a movable frame supporting said drums, a main electro-magnet for controlling said frame, racks for actuating said drums, stops controlling the racks, figuring electro-magnets controlling the said stops, electrical connections between the drawers and the main and figuring electro-magnets, a rake for actuating said racks, an electro-magnet for actuating the rake, also within said connections, and a comb for locking the pinions in their position of rest.

18. In an apparatus for delivering tickets, magazines containing the tickets, drawers for withdrawing the tickets, an electric device for adding the prices of the tickets, actuated by said drawers, and comprising drums carrying pinions, a movable frame supporting said drums, a main electro-magnet for controlling said frame, racks for actuating said drums, stops controlling the racks, figuring electro-magnets controlling the said stops, electrical connections between the drawers and the main and figuring electro-magnets, a rake for actuating said racks, an electro-magnet for actuating the rake, also within said connections, and a comb for locking the pinions in their position of rest, pawls integral with the pinions, a spindle on which the pinions and drums are mounted, forming part of the said movable frame and provided with a slot, a toothed wheel controlling said spindle, a rack controlling the toothed wheel, and an electro-magnet controlling the rack.

The foregoing specification of my improvements in and connected with apparatus for issuing or delivering tickets and other articles, signed by me this seventeenth day of January, 1911.

GEORGES ISIDORE FERDINAND SOULAGE.

Witnesses:
DEAN B. MASON,
R. CHIRIOT.